Feb. 27, 1934.　　　R. J. NORTON　　　1,949,176

BRAKE

Filed Feb. 17, 1931

Inventor
RAYMOND J. NORTON
M. W. McConkey and
By Semmes & Semmes
Attorneys

Patented Feb. 27, 1934

1,949,176

UNITED STATES PATENT OFFICE 1,949,176

BRAKE

Raymond J. Norton, Washington, D. C., assignor to Bendix Brake Company, South Bend, Ind., a corporation of Illinois Application February 17, 1931. Serial No. 516,408

10 Claims. (Cl. 188—78)

This invention relates in general to brakes for use on vehicles, and more especially has reference to improved applying and anchoring means therefor.

The invention hereinafter to be described has application particularly to the type of brakes which have heretofore been known as the duo-servo type. This type of brake is in general an internal expanding brake. The most common forms are those in which either a single braking member or a plurality of braking members linked together extend substantially for an entire circumference within a braking flange. This single braking member or the unit formed by the braking members linked together is adapted to anchor at one of its ends upon rotation of the drum in one direction or the other of its ends upon rotation of the drum in the other direction. Usually the applying means is placed adjacent or between the anchoring ends of the braking unit.

The most common means of anchoring braking units of this type in the past has been that of providing a pin or anchor member for each end of the brake. This anchor member is mounted upon the brake support and extends through a slot in the braking unit which is considerably larger than the anchor pin itself.

Also in certain instances, a single anchor has been provided for the ends of the braking unit, either of said ends abutting said anchor according to the direction of rotation of the drum. In this form of construction the single member which served as an anchor for both of the ends of the braking unit performed no other function, but was merely an anchor for the ends of shoes. In both of the above described forms the applying means has been entirely separate from and independent of the anchoring means. It has been necessary also in nearly every instance to provide guiding means for the ends of the braking units in addition to the anchors and applying means.

One of the objects of this invention is to overcome certain inherent disadvantages in the prior constructions in this art.

Another object of this invention is to provide a brake of the duo-servo type which operates fully as efficiently as the brakes of this type now in use and which will require a smaller number of working parts.

Yet another object of this invention is to provide a duo-servo brake having a brake applying means acting both as an applying means and as a guide for the ends of the braking unit.

Another object of this invention is to provide a brake of the duo-servo type having an applying means which also serves as an anchor for the anchoring ends of the braking unit.

Still another object of this invention is to provide a brake of the duo-servo type having an applying means which performs the triple function of serving as an applying means, as a guide means for the anchoring ends of the braking unit, and as an anchor for both of the anchoring ends of the braking unit.

With these and other important objects in view which may be incident to the improvements described, this invention consists in the parts and combination to be hereinafter set forth and claimed, with the understanding that the several necessary elements comprising the invention may be varied in construction, proportions and arrangement, without departing from the spirit and scope of the appended claims.

In order to make the invention more clearly understood, there is shown in the accompanying drawing means for carrying the same into practical effect without limiting the improvements in their useful applications to the particular constructions which for the purpose of explanation have been made the subject of illustration.

In the drawing.

Referring now more particularly to the drawing wherein similar reference numerals indicate corresponding parts throughout, this embodiment of the invention will be described in detail.

Figure 1:
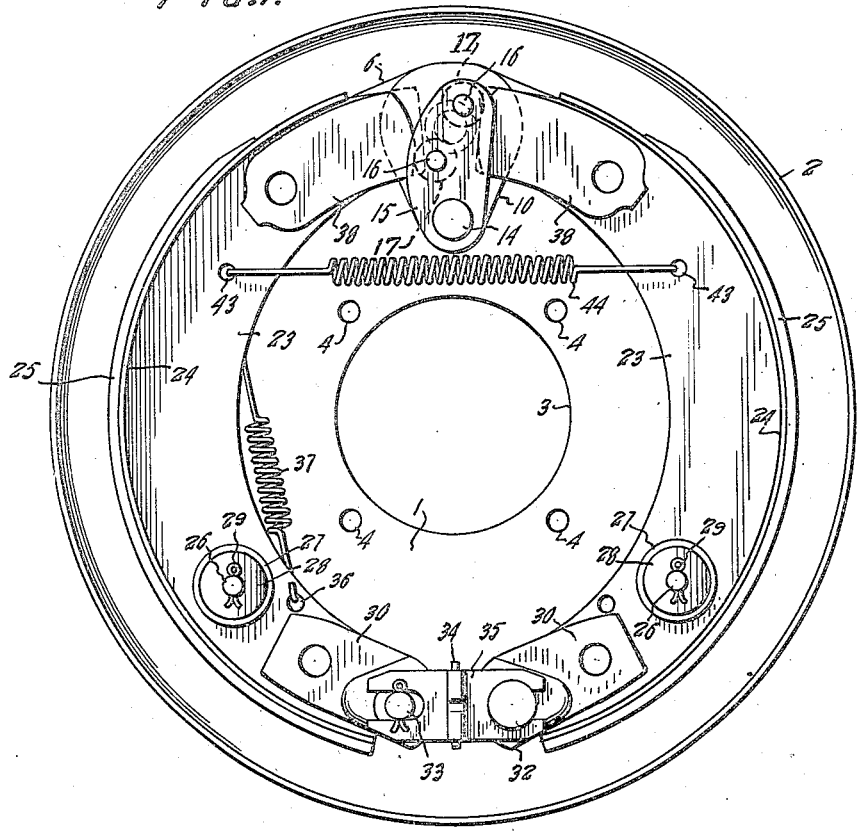
Figure 1 is a side view of a brake of the duo-servo type embodying my invention, the brake drum having been removed therefrom.
Figure 2:
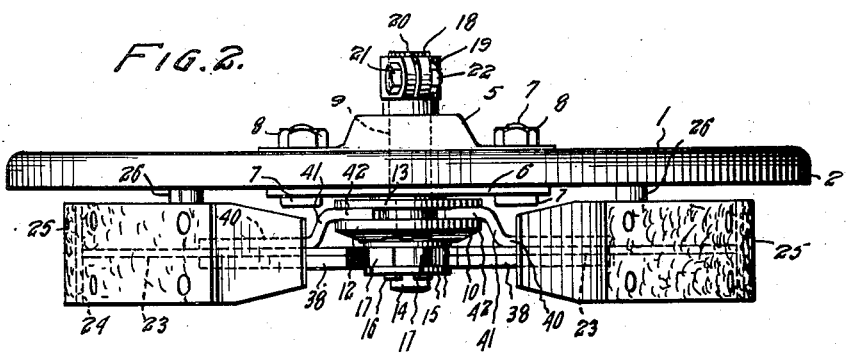
Figure 2 is a plan view of the structure illustrated in Figure 1.

For the purpose of supporting the braking mechanism including both the braking members comprising the assembled braking unit and the applying, guiding, and anchoring means therefor, there is provided a backing plate 1 of the type now commonly in use on many types of motor vehicles. This backing plate 1 is formed at its edges with a flange 2 which serves in cooperation with the brake drum to prevent dirt and other foreign material from entering the braking mechanism. At the center of this backing plate there is an aperture 3 for the purpose of allowing the axle which carries the vehicle wheel to pass therethrough. At spaced points about this aperture there are a plurality of smaller apertures 4 adapted to receive suitable devices for attaching the backing plate to a part of the vehicle axle.

For the purpose of reinforcing the backing plate adjacent the point where the strain of anchoring the brake is to be taken, there is provided a reinforcing member 6 along the inner side of the backing plate. On the outside of the backing plate opposite the reinforcing member 6 there is provided a bearing member 5 which is for the purpose of receiving a part of the applying means as will hereinafter be described. Both the bearing member 5 and the reinforcing member 6 are secured to the backing plate by means of bolts 7 which pass entirely through both of these members and the backing plate and are secured in position by nuts 8 as illustrated.

Passing through the bearing 5 and the backing plate 1, there is a shaft 9 which carries on its inner end a crank-like member 10 for the purpose of applying the brake. This member 10 at the end thereof which receives the end of the shaft 9 is grooved as shown at 11, leaving two radially extending flanges 12 and 13 which serve as guiding members for the ends of the brake shoes in a manner to be hereinafter described. At its other end the member 10 is provided with a crank pin 14 which carries a lever or cam member composed of two side members 15 secured together by means of rivets 16. Between the members 15, and in such position that one will contact with one end of the brake unit whereas the other will contact with the other end of the braking unit, there are provided two bearing members 17 which also serve to space the side members 15 from each other. The rivets 16 are so located that they pass through the centers of the bearing members 17 and provide axes upon which these bearing members may rotate.

At the outer end of the shaft 9 there is a reduced portion 18 adapted to receive a lever or other applying member 19 by which the shaft may be turned. This member 19 may be secured to the shaft by any one of a number suitable and well known expedients, such as, for instance, the split collar arrangement shown at 20 and clamped by means of the bolt 21 and the nut 22.

The braking unit in this case is composed of two braking shoes which are themselves substantially rigid, but which are flexibly joined together at their corresponding ends. These shoes consist of the radial webs 23 which serve the purpose of strengthening and rendering the shoes stiff, and the braking flanges 24 which extend across the outer edges of the webs 23 and form shoes having T-shaped cross sections. The braking flanges 24 carry on their outer surfaces the customary brake lining or friction material 25.

Adjacent the lower portion of the backing plate 1 a pair of guiding and supporting pins 26 are rigidly mounted thereon. These pins project through apertures formed in the webs 23 of the respective brake shoes and receive on the outside of said webs washer members 27 which are spring pressed against the brake shoe web by the spring washers 28. The spring washers are in turn secured in place on the pins 26 by means of cotter keys or like means 29.

Adjacent their lower ends both of the shoes are provided with reinforcements for their stiffening webs 23. These reinforcements comprise the flat members 30 secured to the sides of the webs 23 by any suitable means such as, for instance, by spot welding.

The reinforcing members 30 project beyond the ends of the webs 23 and carry by means of apertures formed in such projections, pins 32 and 33 forming parts of the joint between the two shoes. This joint is of the adjustable type which is comparatively well known and is provided with an adjusting wheel 34 for the purpose of obtaining the proper space between the lower ends of the shoes. The spring member 35 is carried by the ends of the pins 32 and 33 as shown and bears against the adjusting wheel 34 to maintain the adjustment of the brake.

The forward shoe of the braking unit is provided at a point adjacent its lower end with an aperture 36 in its web 23 for the purpose of receiving the end of a coil spring 37. This coil spring is attached at its opposite end to the backing plate in any suitable manner and serves to further support the brake assembly.

At their upper ends the shoes are provided with reinforcing members 38 and 40 attached to the sides of the webs 23. These members 38 and 40 may be secured to the sides of the webs 23 by any suitable means such as described in connection with the reinforcing members 30 at the lower ends of the shoes.

The reinforcing member 38 together with the reinforcing web 23 of each of the shoes extends beyond the end of the braking flange 24 and contacts directly with the bearing member 17 of the brake applying cam lever. This extending portion of the reinforcing member 38 and the web 23 serves the purpose of receiving the brake applying thrust from the applying mechanism which is composed of the crank 10 and the brake applying cam lever mounted thereon.

The other reinforcing member 40 is offset from the central portion of the shoe as clearly shown at 41. The end of this offset portion is formed as shown at 42 to project directly into the slot 11 between the flanges 12 and 13 which have been previously described. By virtue of these reinforcing members having their ends projecting into the groove 11, the upper end of the shoes are prevented from any movement toward or away from the plane of the backing plate 1. They are thus guided by a member which in itself forms a part of the applying means. Another function of this arrangement of elements is that the entire brake anchors through one or the other of the reinforcing members 40 upon the portion of the crank 10 which is concentric with the shaft 9. It will be clearly understood this anchoring occurs selectively on one or the other of the members 40 according to the direction of rotation of the drum. It is also noteworthy that but a single anchor member is used, and that is anchor member 130 is in itself a part of the applying means of the brake.

Each of the brake shoes is provided at some point above its center with an aperture 43 which serves to receive an end of a coil spring 44. This coil spring 44 as disclosed in Figure 1 extends between the two brakes shoes and serves to retain them in their retracted position.

The operation of my invention will be quite apparent from the disclosure of the drawing taken in connection with the above detailed description. The two brake shoes are adjustably and floatingly connected by means of the adjustable point between their lower ends. They are supported on the backing plate by means of the pins 26 and their auxiliary washers 27 and 28. The spring 37 also serves to assist in the support of the brake shoe assembly. The spring 44 extending between the upper ends of the brake shoes serves to retract the shoes from their braking position and to cause them to bear at all times against the bearing members 17 of the applying cam lever.

The lower ends of the brake shoes are prevented from movement toward or from the plane of the backing plate by means of the pins 26 in conjunction with the washers 27 and 28 which are carried thereon. The upper ends of the shoes are prevented from such movement by virtue of the fact that the portions 42 of the reinforcing members 40 extend into the slot or groove 11. It will thus be seen that the braking unit is positioned very securely by means of the various springs and other supports so that it will at all times be maintained upon the backing plate in the proper position with respect thereto.

When it is desired to apply the brake, the shaft 9 is turned by means of the lever member 19, thus causing the crank member 10 on the interior member of said shaft to be rotated. It will readily be seen that a rotation of this crank member will cause the bearing members 17 to separate the adjacent ends of the braking unit. Because of the arrangement of the springs and the manner in which the bearing members 17 are positioned on the applying lever, the shoe to the left as viewed in the two figures of the drawing will be first pushed outwardly toward the drum. As soon as this shoe comes in contact with the drum the rotation of the drum will carry it around one way or the other so that one or the other of the ends 42 of the members 40 will anchor against the bottom of the groove 11 in the crank 10. The crank 10 will then be serving the triple purpose of applying the brake, of restraining the upper ends of the shoes from lateral movement and of serving as an anchor for the brake.

It will be apparent from the above that I have provided an arrangement in which the customary heavy anchor members have been replaced by a portion of the applying mechanism, and that parts have, therefore, been omitted without any consequent defect from their omission.

It will be further apparent that I have provided a mechanism in which a part of the applying means serves as a guide for the upper portion of the braking unit.

It will also be apparent that I have provided a brake in which a part of the applying means serves the triple function of assisting in the application of the brake, of guiding the ends of the brake shoes and of serving as an anchor for the brake in either direction or rotation.

It is apparent that all of these improvements have been carried out without in any way impairing the efficiency of operation of the duo-servo brake as it previously existed. In the present invention fewer parts are used without any loss of any particular function of any part thereof.

While I have shown and described the preferred embodiment of the invention, it is to be understood that I do not confine myself to the precise details of construction herein set forth by way of illustration for the reason that it is apparent that many changes and variations may be made therein by a person skilled in the art without departing from the spirit or scope of this invention.

I therefore wish it to be distinctly understood that the scope of this invention is to be limited only by the prior art and the terms of the appended claims.

I claim:

1. In a floating duo-servo brake having a plurality of brake shoes and a fixed support, an anchor adapted to take circumferential thrust directly for both directions of drum rotation comprising an applying shaft journalled in the support and means associated with the shaft for positioning the brake shoes transversely.

2. In a floating duo-servo brake having a plurality of brake shoes and a fixed support, an anchor adapted to take circumferential thrust directly for both directions of drum rotation comprising an applying shaft journalled in said support and an applying member mounted on said shaft said applying member being provided with means for transversely positioning the shoes comprising the brake.

3. In a floating duo-servo brake having a plurality of brake shoes and a fixed support, an anchor adapted to take circumferential thrust directly for both directions of drum rotation comprising an applying shaft journalled in said support and an applying lever mounted on said shaft said lever being provided with means to fix the transverse position of the brake.

4. In a floating duo-servo brake having a plurality of brake shoes a fixed support, an anchor adapted to take circumferential thrust directly for both directions of drum rotation comprising an applying shaft journalled in said support and a crank mounted on said shaft said crank being formed with means for positioning the brake shoes transversely.

5. In a brake, a braking unit including a plurality of brake shoes adapted to anchor at one end or the other according to the direction of wheel rotation, floating means between said ends for expanding said braking unit to apply the brake and rotatable non-shiftable means for actuating said floating means, said non-shiftable means forming an anchor for taking circumferential thrust directly from either of said ends and serving to position the brake shoes transversely.

6. In a brake, a support, a braking unit adapted to anchor at one end or the other according to the direction of wheel rotation, and means between said ends for expanding said unit to apply the brake, said means including a floating spreading means and a part pivoted on said support for actuating the spreading means, said part forming an anchor for taking circumferential thrust directly from either of said ends and a transverse positioning means for the brake shoes.

7. In a brake, a support, a braking unit adapted to anchor at one end or the other according to the direction of wheel rotation, and means between said ends for expanding said unit to apply the brake, said means including a floating spreading cam and a part pivoted on the support for actuating the spreading cam, said part forming an anchor for taking circumferential thrust directly from either of said ends and also forming a transverse positioning means for the said ends.

8. In a brake, a support, a braking unit adapted to anchor at one end or the other according to the direction of wheel rotation, and means between said ends for expanding said unit to apply the brake, said means including a crank pivoted on said support and a floating lever carried by the arm of said crank to be actuated thereby, and parts on both of said ends adapted to anchor on said crank adjacent its pivot to deliver circumferential thrust directly thereto and also adapted to cooperate with the said crank to transversely position the shoes.

9. In a brake, a support, a braking unit adapted to anchor at one end or the other according to the direction of wheel rotation, and means between said ends for expanding said unit to apply the brake, said means including a floating spreading cam and a part pivoted on the support for actuating the spreading cam, said part forming an anchor for taking circumferential thrust directly from either of said ends and also forming means for positioning said ends transversely.

10. In a brake, a braking unit adapted to anchor at one end or the other according to the direction of wheel rotation, floating means between said ends for expanding said braking unit to apply the brake and rotatable non-shiftable means for actuating said floating means, said non-shiftable means forming an anchor for taking circumferential thrust directly from either of said ends, and also forming means for positioning said ends transversely.

RAYMOND J. NORTON.